United States Patent
Kates et al.

(10) Patent No.: US 9,559,864 B1
(45) Date of Patent: Jan. 31, 2017

(54) METHOD AND SYSTEM FOR MANAGING WIRELESS DEVICES USING SHORT-RANGE WIRELESS COMMUNICATION

(75) Inventors: Jesse M. Kates, Kansas City, MO (US); Jason R. Delker, Olathe, KS (US); John M. Everson, Leawood, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1411 days.

(21) Appl. No.: 12/619,317

(22) Filed: Nov. 16, 2009

(51) Int. Cl.
*H04L 12/46* (2006.01)
*H04W 88/06* (2009.01)
*H04L 12/927* (2013.01)

(52) U.S. Cl.
CPC .......... H04L 12/4604 (2013.01); H04L 47/80 (2013.01); H04W 88/06 (2013.01)

(58) Field of Classification Search
CPC ...... H04L 12/4604; H04L 47/80; H04W 88/06
USPC ....... 370/229, 230, 231, 248, 252, 282, 353, 370/395.21, 401, 420; 709/225, 226, 228; 726/2–7
See application file for complete search history.

(56) References Cited

U.S. PATENT DOCUMENTS

| | | | |
|---|---|---|---|
| 5,029,233 A | 7/1991 | Metroka | |
| 5,845,207 A | 12/1998 | Amin et al. | |
| 6,446,127 B1 | 9/2002 | Schuster et al. | |
| 6,842,613 B2 | 1/2005 | Mittal | |
| 7,228,355 B2* | 6/2007 | Dowling | 709/230 |
| 7,274,928 B2 | 9/2007 | Netanel et al. | |
| 7,277,547 B1 | 10/2007 | Delker et al. | |
| 2003/0031305 A1 | 2/2003 | Netanel et al. | |
| 2004/0158618 A1* | 8/2004 | Shaw | 709/217 |
| 2004/0242209 A1 | 12/2004 | Kruis et al. | |
| 2005/0265323 A1* | 12/2005 | Thermond | 370/356 |
| 2005/0286476 A1* | 12/2005 | Crosswy et al. | 370/338 |
| 2006/0063560 A1* | 3/2006 | Herle | 455/552.1 |
| 2006/0184934 A1 | 8/2006 | Karlberg | |
| 2006/0190575 A1 | 8/2006 | Harvey et al. | |
| 2008/0057935 A1 | 3/2008 | Netanel et al. | |
| 2008/0064367 A1 | 3/2008 | Nath et al. | |
| 2008/0096580 A1* | 4/2008 | Montemurro | 455/456.1 |

(Continued)

OTHER PUBLICATIONS

"An introduction to OMA Device Management," http://www.ibm.com/developerworks/library/wi-oma/index.html, printed on May 19, 2009.

(Continued)

*Primary Examiner* — Redentor Pasia

(57) ABSTRACT

A wireless device includes a self-activation client that allows a user to activate a communication service for that wireless device and for one or more other wireless devices. The communication service may use a long-range type of wireless communication, such as 1xRTT CDMA, EV-DO, GSM, or IEEE 802.16 (WiMAX) communication. During the activation process, the wireless device communicates with a device management server using the long-range type of wireless communication but communicates with the one or more other wireless devices using a short-range type of wireless communication, such as IEEE 802.11 (WiFi), Bluetooth, or infrared communication. After the communication service has been activated, the wireless device may subsequently communicate with the device management server in order to manage the communication service for itself and/or for one or more other wireless devices (e.g., to receive updates or to make changes).

18 Claims, 3 Drawing Sheets

(56) References Cited

U.S. PATENT DOCUMENTS

| | | | |
|---|---|---|---|
| 2009/0017789 A1* | 1/2009 | Thomas et al. | 455/406 |
| 2009/0025070 A1 | 1/2009 | Netanel et al. | |
| 2009/0318124 A1* | 12/2009 | Haughn | 455/418 |
| 2010/0103910 A1* | 4/2010 | Verma | 370/338 |

OTHER PUBLICATIONS

"Microsoft unveils device management infrastructure," http://www.windowsfordevices.com/news/NS7777665169.html, printed on Jun. 18, 2009.

InnoPath, "iMDM Server Suite," 2008.

"The Device Management (DM) Session," http://www.msdn.microsoft.com/en-us/library/bb737302(printer).aspx, printed on May 19, 2009.

"Mobile Device Manager Device Management Server Architecture," Microsoft TechNet, http://technet.microsoft.com/en-us/library/dd261915(printer).aspx, printed on Jun. 18, 2009.

"Mobile Device Manager Device Access Connection Method," Microsoft TechNet, http://technet.microsoft.com/en-us/library/dd261848(printer).aspx, printed on Jun. 18, 2009.

"Mobile Device Manager Client Architecture," Microsoft TechNet, http://technet.microsoft.com/en-us/library/dd252821(printer).aspx, printed on Jun. 18, 2009.

"Mobile Device Manager Gateway Server Architecture," Microsoft TechNet, http://technet.microsoft.com/en-us/library/dd252759(printer).aspx, printed on Jun. 18, 2009.

"MDM Enrollment Server Architecture," Microsoft TechNet, http://technet.microsoft.com/en-us/library/dd261813(printer).aspx, printed on Jun. 18, 2009.

John Cox, "Microsoft takes big step in managing enterprise handhelds," NetworkWorld, Apr. 3, 2008.

Red Bend Software, "vDirect Mobile™ Device Management Client," printed from www.redbend.com on Jun. 18, 2009.

* cited by examiner

METHOD AND SYSTEM FOR MANAGING WIRELESS DEVICES USING SHORT-RANGE WIRELESS COMMUNICATION

BACKGROUND

When a wireless service subscriber purchases a new wireless communication device, such as a wireless telephone, the subscriber typically goes through a service activation process to activate the subscriber's wireless service on the new device. This service activation process is traditionally performed at a wireless service provider's retail location, such as the retail location where the new wireless device is purchased, with the aid of trained personnel who may be employed by the wireless service provider.

As an alternative, various types of subscriber self-activation approaches have been proposed. In these approaches, a wireless service subscriber may activate and configure a desired wireless communication service on a new wireless communication device on his or her own. In one such approach, a subscriber may activate a wireless communication service on a new wireless device by having the wireless device communicate with an activation system of the wireless service provider, for example, using an over-the-air (OTA) activation process. During the OTA activation process, the subscriber may enter information into the wireless device, and the wireless device may communicate this information to the wireless service provider's activation system. The wireless service provider may then use this information to create a service profile for the wireless communication service. For example, during the OTA activation process, the subscriber may be prompted to enter the subscriber's name and address, as well as the specifics of the desired wireless communication service (such as the type of service plan or the features to be included in the wireless communication service). When the OTA activation process is successfully completed, the new wireless device may then be able to the use the wireless communication service under the subscriber's service profile.

In addition to self-activation, a wireless communication device may be able to engage in other types of device management functions. For example, the Open Mobile Alliance (OMA) includes a Device Management (DM) Working Group that has issued various DM specifications for managing wireless communication devices. The OMA DM specifications support such device management functions as device provisioning (such as initial activation of wireless service and enabling or disabling features), device configuration (such as changing settings or parameters on the device), software upgrades (such as obtaining upgrades for existing software or obtaining software for new applications), and fault management (such as reporting errors from the wireless device).

OVERVIEW

In a first principal aspect, an exemplary embodiment provides a method for device management. In accordance with the method, a communication session is established using a first type of wireless communication. The communication session involves at least a first wireless device and a second wireless device. The first wireless device manages at least one communication service for the second wireless device by wirelessly communicating with at least one server. The at least one communication service uses a second type of wireless communication that has a longer range than the first type of wireless communication.

In a second principal aspect, an exemplary embodiment provides a method for service activation. In accordance with the method, a first communication session is established among a plurality of wireless devices using a first type of wireless communication. The plurality of wireless devices includes at least a first wireless device and a second wireless device. A second communication session is established between the first wireless device and at least one server. The first wireless device communicates with the at least one server in the second communication session to activate at least one communication service for at least one of the plurality of wireless devices. The at least one communication service uses a second type of wireless communication that has a longer range than the first type of wireless communication.

In a third principal aspect, an exemplary embodiment provides a wireless device comprising a first transceiver for communicating using a first type of wireless communication, a second transceiver for communicating using a second type of wireless communication that has a longer range than the first type of wireless communication, and a self-activation client. The self-activation client is configured to (i) activate at least one communication service for the wireless device by wirelessly communicating with at least one server via the second transceiver and (ii) activate the at least one communication service for at least one other wireless device by wirelessly communicating with the at least one other wireless device via the first transceiver and with the at least one server via the second transceiver. The at least one communication service uses the second type of wireless communication.

DETAILED DESCRIPTION OF EXEMPLARY EMBODIMENTS

1. Introduction

Figure 1:
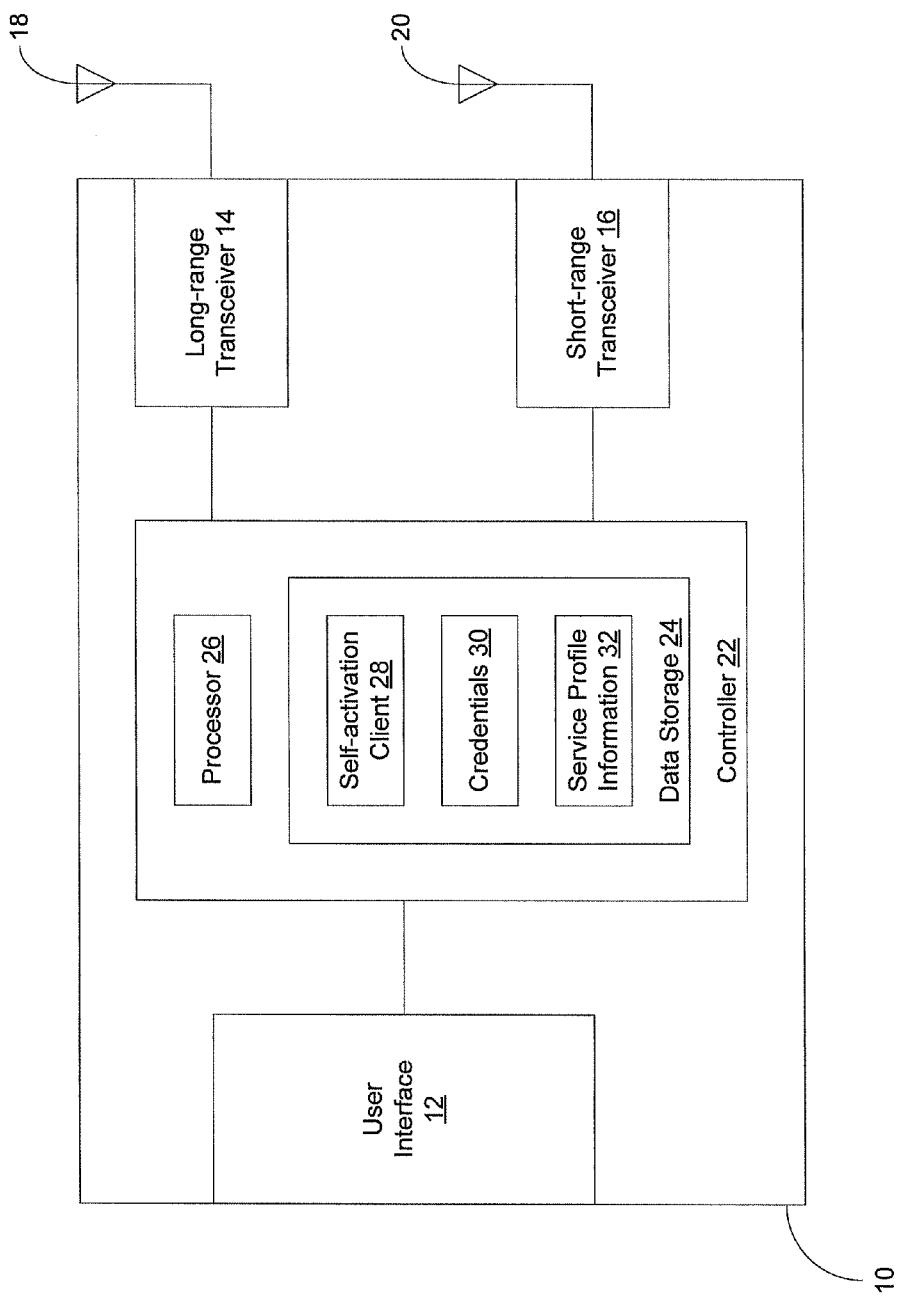
FIG. 1 is a block diagram of a wireless communication device, in accordance with an exemplary embodiment.

The inventors have recognized that the conventional device self-activation process, while beneficially allowing a subscriber to activate a wireless communication service for a wireless device on his or her own, can still be undesirably time-consuming. This is because a subscriber may spend a substantial amount of time and effort entering information into the wireless device in order to activate the desired wireless service. The device self-activation process may be especially frustrating when the subscriber is trying to activate multiple wireless devices.

To streamline the process of activating or configuring a wireless communication service for multiple wireless devices, the inventors propose an approach that allows a subscriber to extend the activation or configuration process to include multiple wireless devices by having the multiple wireless devices communicate using a short-range type of wireless communication. The short-range wireless communication may use, for example, IEEE 802.11 (WiFi), Bluetooth, or infrared communication. The short-range wireless communication may use a low-power mode to further restrict the effective communication range. In contrast, the wireless communication service being activated or configured may use a long-range type of wireless communication, such as 1×RTT CDMA, EV-DO, GSM, or IEEE 802.16 (WiMAX) communication.

In one example, a subscriber may have a first wireless device for which a wireless communication service with a desired configuration or wireless service plan has already been activated (e.g., using a self-activation process or other type of activation process). To extend the wireless communication service to one or more additional wireless devices, the subscriber may place the additional wireless devices in close proximity with the first wireless device and then interact with user interfaces on the respective devices to establish a communication session among the wireless devices that uses a short-range type of wireless communication. During this short-range communication session, the additional wireless devices may send their respective device-specific credentials and/or other information needed for service activation to the first wireless device. The first wireless device may also engage in a communication session with the wireless service provider's activation system, for example, using a long-range type of wireless communication. During the long-range communication session, the first wireless device may forward the device-specific credentials from the additional wireless devices to the activation system and request activation of the wireless communication service on the additional wireless devices. Upon successful activation, the additional wireless devices may use the wireless communication service with the same configuration or wireless service plan as the first wireless device.

In this way, a new wireless service may be activated on the additional wireless devices, or the existing wireless service on the additional devices may be changed (either temporarily or indefinitely), to use the configuration or wireless service plan of the first wireless device. By using a short-range type of wireless communication, the effective range of the inter-device communication may be limited so as to prevent unknown or undesired wireless devices from participating in the activation process surreptitiously.

In another example, a subscriber may use a self-activation process to activate a wireless communication service on multiple wireless devices at the same time. To accomplish self-activation for multiple wireless devices, the subscriber may place the wireless devices in close proximity and interact with their user interfaces so that they begin communicating with one another using a short-range type of wireless communication. The subscriber may then use one of the wireless devices as a primary device for communicating with the wireless service provider's self-activation service (e.g., using a long-range type of wireless communication) on behalf of all the wireless devices. The subscriber may enter information into the primary wireless device that is then communicated to the activation service to create a service profile for the desired wireless communication service. The primary wireless device may also receive device-specific credentials from the other wireless devices, using the short-range wireless communication, and forward them to the activation service. Upon successful activation, the multiple wireless devices (including the primary device and the other devices) may all be able to use the wireless communication service under the same service profile.

More generally, a first wireless device may communicate with one or more servers (which may include a device management server, activation server, configuration server and/or other type of server) to manage at least one communication service for a second wireless device. The device management could involve, for example, service activation, configuration management, software or firmware provisioning or upgrades, or fault management for the second wireless device. To effect such device management, the first wireless device and second wireless device may communicate using short-range wireless communication and the first wireless device may communicate with a device management server (or other type of server or servers) using long-range wireless communication.

In this way, a subscriber may beneficially activate a wireless communication service, or otherwise manage a wireless communication service, by having multiple wireless devices communicate using a short-range type of wireless communication.

2. Exemplary Wireless Device

FIG. 1 illustrates an exemplary wireless device 10. Wireless device 10 could be, for example, a wireless telephone, wireless personal digital assistant (PDA), wirelessly-equipped laptop computer, or other type of wireless communication device. Once the appropriate wireless communication service has been activated, a user may use wireless device 10 to send and/or receive voice, video, data, or other media.

The user may interact with wireless device 10 through a user interface 12. User interface 12 may include a speaker for conveying voice or other audio to a user and may include a microphone for receiving voice or other audio from a user. Alternatively, wireless device 10 may be communicatively coupled to an external speaker and/or microphone. User interface 12 may also include a display for displaying visual information, such as text, graphics, or video. In some cases, the display may include a touch screen for receiving tactile input from the user, for example, to allow the user to control the operation of wireless device 10. Alternatively or additionally, user interface 12 may include a keypad, buttons, or other types of controls. Thus, a user may interact with user interface 12 in order to control the operation of wireless device 10 and in order to send or receive voice, video, data, and/or other media, e.g., during communication sessions with other wireless devices, landline stations, or servers.

To enable wireless communication, wireless device 10 may include a long-range transceiver 14 and a short-range transceiver 16. Long-range transceiver 14 may be able to send and receive wireless signals (e.g., via an antenna 18) so as to communicate using a long-range type of wireless communication, such as 1×RTT CDMA, EV-DO, GSM, or WiMAX communication. Short-range transceiver 16 may be able to send and receive wireless signals (e.g., via an antenna 20) so as to communicate using a short-range type of wireless communication, such as WiFi, Bluetooth, or infrared communication.

It is to be understood that the configuration of transceivers and antennas illustrated in FIG. 1 is exemplary only. For example, if infrared communication is used as the short-range type of communication, then short-range transceiver 16 may communicate via an infrared emitter and detector instead of an antenna. In addition, instead of a separate short-range transceiver, a wireless device might include a single transceiver that operates in a high-power mode for long-range wireless communication and a low-power mode for short-range wireless communication.

Wireless device 10 may be controlled by a controller 22, which may be communicatively coupled to user interface 12, long-range transceiver 14, and short-range transceiver 16. In an exemplary embodiment, controller 12 controls wireless device 22 in accordance with software that is stored in data storage 24 and executed by a processor 26.

Such software may include a self-activation client 28 for self-activation of wireless communication service on wireless device 10 and/or other wireless devices. For example, self-activation client 28 may be configured to activate at least one wireless communication service for wireless device 10 by an over-the-air (OTA) activation process. The OTA activation process may involve wirelessly communicating with at least one server (e.g., one or more servers that make up a wireless service provider's activation system) via long-range transceiver 14. Thus, the OTA activation process may use a long-range type of wireless communication and the communication service being activated may also use this long-range type of wireless communication.

Self-activation client 28 may also be configured to activate at least one wireless communication service on other wireless devices. To extend the activation process to other wireless devices, self-activation client 28 may cause wireless device 10 to communicate with at least one server via long-range transceiver 14, using the long-range type of wireless communication, and to communicate with at least one other wireless device via short-range transceiver 16, using the short-range type of wireless communication.

Data storage 24 may also store credentials 30 that self-activation client 28 causes wireless device 10 to transmit during the self-activation process. Credentials 30 may include an electronic serial number (ESN), password, code, and/or other data that is used to authenticate wireless device 10 for the self-activation process. If wireless device 10 is used to active wireless service on other wireless devices, then data storage 24 may also store the credentials of other wireless devices.

Data storage 24 may also store service profile information 32 that self-activation client 28 causes wireless device 10 to transmit during the self-activation process. Service profile information 32 may include information regarding the user of wireless device 10, such as the user's name and address, and may include information regarding the wireless communication service to be activated, such as type of wireless service plan or the features to be included in the wireless communication service. The user may enter the service profile information 32 into wireless device 10 (e.g., using user interface 12), and wireless device 10 may transmit the service profile information 32 to the wireless service provider's activation system in order to create a service profile for the wireless communication service. Once the wireless communication service is activated, wireless device 10 may use the communication service under that service profile. If wireless device 10 is used to activate the wireless communication service for one or more other wireless devices, then those other wireless devices may also use the communication service under that service profile.

It is to be understood that the aforementioned functions of self-activation client 28 are exemplary only. For example, self-activation client 28 could be a device management client that is configured to perform device management functions in addition to service activation, on behalf of wireless device 10 and/or on behalf of other wireless devices. In still other cases, data storage 24 may store different software clients that are configured to perform different device management functions.

3. Exemplary Methods of Operation

Figure 2:
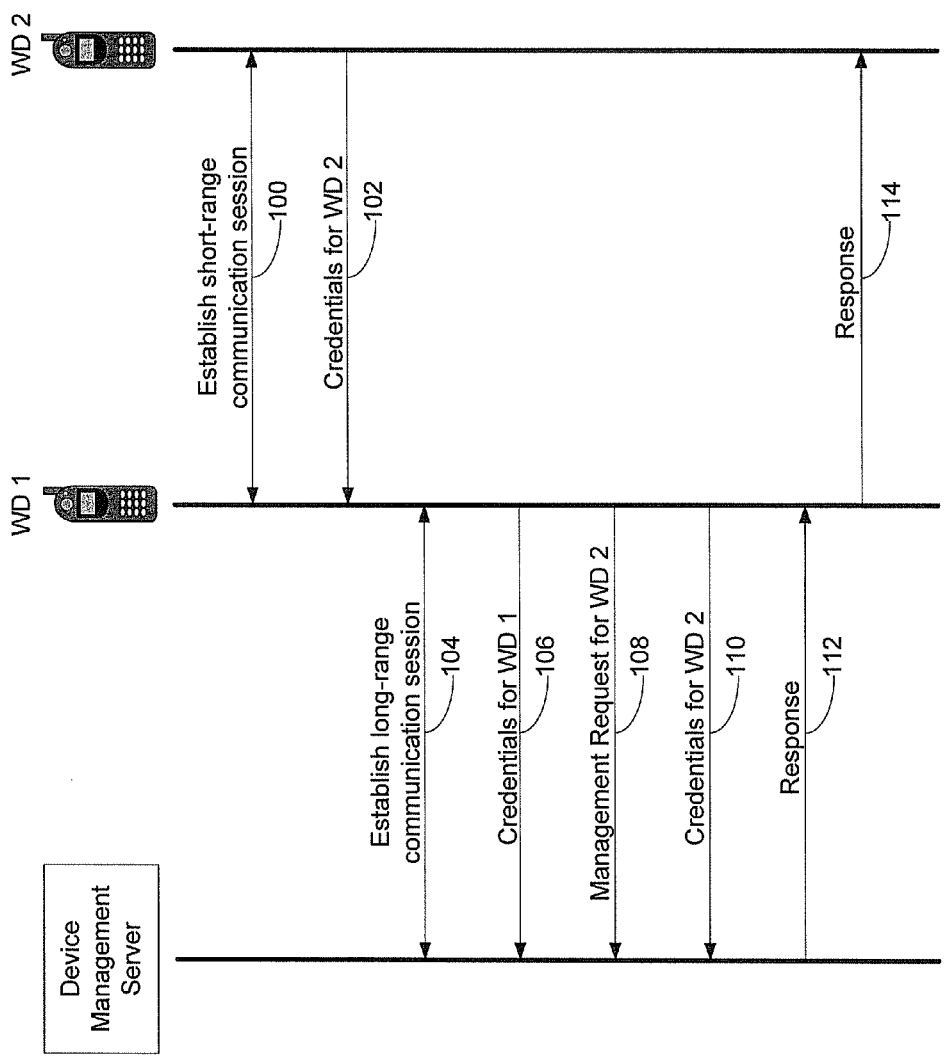
FIG. 2 is a call flow diagram for a device management process, in accordance with an exemplary embodiment.

As discussed above, a first wireless device (such as wireless device 10 illustrated in FIG. 1) may activate a wireless communication service on a second wireless device or may perform other device management functions on behalf of a second wireless device. FIG. 2 illustrates a call flow in which a first wireless device (WD 1) manages a wireless communication service for a second wireless device (WD 2). The first and second wireless devices could be configured as shown in FIG. 1 or in some other manner. The wireless communication service being managed may use a long-range type of wireless communication, such as 1×RTT CDMA, EV-DO, GSM, or WiMAX. The management of this communication service could involve, for example, activating the service, configuring the service, changing the service (e.g., so that WD 2 uses the communication service under the service profile of WD 1), or updating the service (e.g., updating the software or parameters that the second wireless device uses for the communication service).

The device management process may begin by establishing a short-range communication session between WD 1 and WD 2, as indicated by step 100. The short-range communication session may use a short-range type of wireless communication. To establish this short-range communication session, a user may place WD 1 and WD 2 in proximity to one another (i.e., within the effective range of the short-range wireless communication) and then interact with the user interfaces of WD 1 and WD 2 to initiate the communication session and to indicate the type of device management function to be performed. During the short-range communication session, WD 2 may transmit to WD 1 device-specific credentials, as indicated by step 102.

To perform the requested device management, WD 1 may establish a long-range communication session with a device management server, as indicated by step 104. The long-range communication session may use a long-range type of wireless communication. To authenticate itself for the device management process, WD 1 may transmit its credentials to the device management server, as indicated by step 106. Once authenticated, WD 1 may then transmit a management request on behalf of WD 2 to the device management server, as indicated by step 108. To authenticate WD 2 for the device management process, WD 1 may also transmit the credentials for WD 2, as indicated by step 110.

The device management server may respond to the management request by transmitting a management response to WD 1, as indicated by step 112, and WD 1 may transmit the management response to WD 2, as indicated by step 114. The nature of the management response may depend on the nature of the management request. For example, if the management request requested service activation, then the management response may include an acknowledgement of successful activation as well as parameters, codes, or other information that WD 2 will need to use the newly-activated wireless communication service. If the management request requested an update of software or applications used for the wireless communication service, then the management response may include one or more software updates.

It is to be understood that the device management call flow illustrated in FIG. 2 is illustrative only. For example, although FIG. 2 shows the short-range communication session being established before the long-range communication session, the long-range communication session could be established first. In addition, although WD 1 is shown communicating with a device management server, the long-range communication session could involve other and/or additional servers. Moreover, the short-range communication session could involve one or more wireless devices in addition to WD 1 and WD 2. Thus, one wireless device (such as WD 1) might perform device management functions on behalf of a plurality of other wireless devices.

Figure 3:
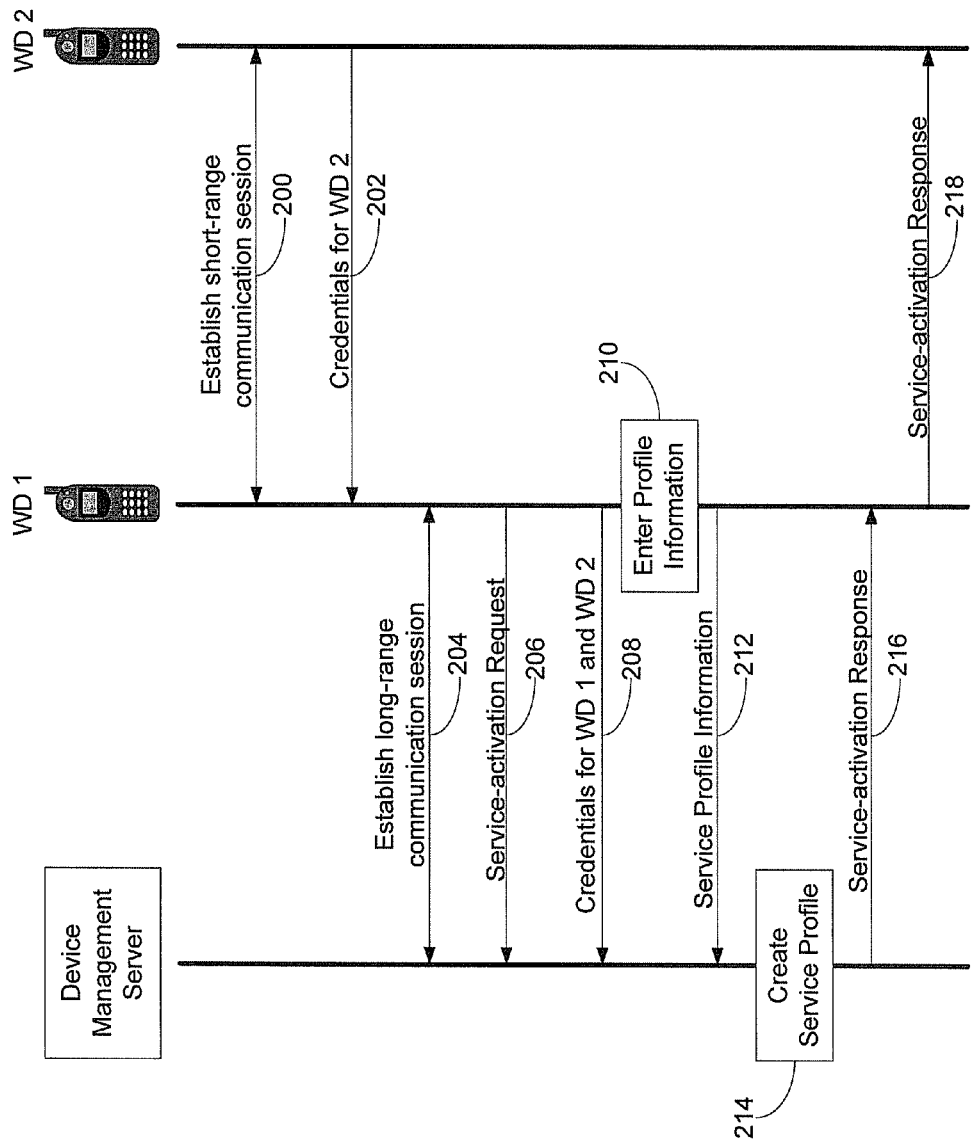
FIG. 3 is a call flow diagram for a service activation process, in accordance with an exemplary embodiment.

FIG. 3 illustrates a call flow for a specific type of device management, namely, a self-activation process in which WD 1 communicates with the device management server in order to activate at least one communication service on both WD 1 and WD 2. The process may begin with the establishment of a short-range communication session between WD 1 and WD 2, as indicated by step 200. During the short-range communication session, WD 2 may transmit its credentials to WD 1, as indicated by step 202.

WD 1 also establishes a long-range communication session with the device management server, as indicated by step 204. Once the long-range communication session is established, WD 1 transmits a service-activation request to the device management sever, as indicated by step 206. The service-activation request is a request to activate at least one wireless communication service (e.g., using the long-range type of wireless communication) on WD 1 and WD 2. To establish that WD 1 and WD 2 are entitled to activate this communication service, WD 1 may transmit the credentials for WD 1 and WD 2 to the device management server.

The user may then enter service profile information into WD 1, as indicated by step 210, and WD 1 may transmit the service profile information to the device management server, as indicated by step 212. The entry of service profile information may be an interactive process that may involve several iterations of device management server sending instructions to WD 1, WD 1 responsively indicating on its user interface what information the user should enter, and WD 1 transmitting the information entered by the user to the device management server.

After receiving the service profile information, the device management server may create a service profile for the wireless communication service, as indicated by step 214. The device management server may also send a service-activation response to WD 1, as indicated by step 216, which WD 1 forwards to WD 2, as indicated by step 218. The service-activation response may include an acknowledgement of successful service activation. The service-activation response may also include additional information, such as configuration parameters, codes, or instructions that enable WD 1 and WD 2 to use the wireless communication service.

After successful service activation, WD 1 and WD 2 are both able to use the wireless communication service under the service profile created in step 214. By having the service profile information entered into one wireless device and applied to multiple wireless devices, the process of activating wireless communication services on multiple wireless devices may be streamlined. Moreover, although FIG. 3 shows only WD 1 and WD 2 involved in the short-range communication session, additional wireless devices could be involved provided that the wireless devices are within the effective range of the short-range wireless communication. Thus, one wireless device (such as WD 1) might communicate with a device management server (or other types of servers) to activate a wireless communication service on that wireless device and on one or more other wireless devices.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for device management, comprising:
establishing a communication session that involves at least a first wireless device and a second wireless device, wherein each of said first and second wireless devices includes a respective short-range transceiver for a short-range type of wireless communication and a respective long-range transceiver for a long-range type of wireless communication that has a longer range than said short-range type of wireless communication, and wherein said communication session uses said short-range type of wireless communication; and
said first wireless device activating at least one communication service for said second wireless device by wirelessly communicating with at least one server using said long-range type of wireless communication, wherein said at least one communication service involves use of said long-range type of wireless communication by said long-range transceiver of said second wireless device.

2. The method of claim 1, further comprising:
said first wireless device receiving credentials from said second wireless device in said communication session.

3. The method of claim 2, wherein said first wireless device activating at least one communication service for said second wireless device by wirelessly communicating with at least one server comprises:
said first wireless device transmitting said credentials to said at least one server.

4. The method of claim 1, further comprising:
said first wireless device receiving a response from said device management server; and
said first wireless device transmitting said response to said second wireless device in said communication session, wherein said response enables said second wireless device to use said at least one communication service.

5. The method of claim 4, wherein said response comprises at least one service parameter.

6. The method of claim 4, wherein said response comprises software or firmware.

7. The method of claim 1, wherein activating at least one communication service for said second wireless device comprises:
activating said at least one communication service for subsequent use by said second wireless device.

8. The method of claim 7, wherein said first wireless device is able to use said at least one communication service under a service profile, and wherein activating said at least one communication service for subsequent use by said second wireless device comprises enabling said second wireless device to use said at least one communication service under said service profile.

9. The method of claim 1, wherein activating at least one communication service for said second wireless device comprises:
changing said at least one communication service for said second wireless device.

10. The method of claim 9, wherein said first wireless device is able to use said at least one communication service under a first service profile and said second wireless device is able to use said at least one communication service under a second service profile, and wherein changing said at least one communication service for said second wireless device comprises enabling said second wireless device to use said at least one communication service under said first service profile.

11. The method of claim 1, wherein said short-range type of wireless communication comprises IEEE 802.16 communication, Bluetooth communication, or infrared communication.

12. The method of claim 1, wherein said communication session further involves a third wireless device.

13. The method of claim 12, further comprising:
said first wireless device managing said at least one communication service for said third wireless device by wirelessly communicating with said at least one server using said long-range type of wireless communication.

14. A method for service activation, comprising:
establishing a first communication session among a plurality of wireless devices, said plurality of wireless devices including at least a first wireless device and a second wireless device, wherein each of said first and second wireless devices includes a respective short-range transceiver for a short-range type of wireless communication and a respective long-range transceiver for a long-range type of wireless communication that has a longer range than said short-range type of wireless communication, and wherein said first communication session uses said short-range type of wireless communication;
establishing a second communication session between said first wireless device and at least one server; and
said first wireless device communicating with said at least one server in said second communication session to activate at least one communication service for subsequent use by at least said second wireless device, wherein said at least one communication service involves said long-range transceiver of said at least said second wireless device using said long-range type of wireless communication.

15. The method of claim 14, wherein said first wireless device communicating with said at least one server in said second communication session to activate at least one communication service for subsequent use by at least said second wireless device comprises:
said first wireless device communicating with said at least one server in said second communication session to activate said at least one communication service for subsequent use by all of said plurality of wireless devices.

16. The method of claim 15, further comprising:
said first wireless device receiving service profile information;
said first wireless device communicating said service profile information to said at least one server in said second communication session.

17. The method of claim 16, further comprising:
creating a service profile based on said service profile information, such that all of said plurality of wireless devices are subsequently able to use said at least one communication service under said service profile.

18. The method of claim 17, wherein said first wireless device is involved in said second communication session while said first wireless device is involved in said first communication session.

* * * * *